US010649695B1

(12) United States Patent
Liao (10) Patent No.: US 10,649,695 B1
(45) Date of Patent: May 12, 2020

(54) COMMAND PROCESSING METHOD AND STORAGE CONTROLLER USING THE SAME

(71) Applicant: Shenzhen EpoStar Electronics Limited CO., Shenzhen (CN)

(72) Inventor: Shih-Tien Liao, Hsinchu (TW)

(73) Assignee: Shenzhen EpoStar Electronics Limited CO., Shenzhen (CN)

(*) Notice: Subject to any disclaimer, the term of this patent is extended or adjusted under 35 U.S.C. 154(b) by 0 days.

(21) Appl. No.: 16/253,234

(22) Filed: Jan. 22, 2019

(30) Foreign Application Priority Data

Nov. 2, 2018 (TW) .................................. 107139069

(51) Int. Cl.
*G06F 3/06* (2006.01)
*G06F 9/52* (2006.01)
*G06F 9/54* (2006.01)

(52) U.S. Cl.
CPC ............ *G06F 3/0659* (2013.01); *G06F 3/061* (2013.01); *G06F 3/0679* (2013.01); *G06F 9/524* (2013.01); *G06F 9/546* (2013.01); *G06F 2209/548* (2013.01)

(58) Field of Classification Search
CPC ...... G06F 3/0659; G06F 3/0679; G06F 3/061; G06F 9/546; G06F 9/524; G06F 2209/548
See application file for complete search history.

(56) References Cited

U.S. PATENT DOCUMENTS

| 6,694,390 | B1* | 2/2004 | Bogin | G06F 13/24 710/200 |
| 8,332,542 | B2 | 12/2012 | Casper et al. | |
| 9,128,924 | B2 | 9/2015 | Tsadik et al. | |
| 2003/0105943 | A1* | 6/2003 | Yeh | G06F 9/3004 712/216 |
| 2004/0243739 | A1 | 12/2004 | Spencer | |
| 2004/0267706 | A1* | 12/2004 | Springer, Sr. | G06F 3/061 |
| 2015/0161054 | A1* | 6/2015 | Ghai | G06F 12/0811 711/135 |

FOREIGN PATENT DOCUMENTS

WO 2014025731 2/2014

OTHER PUBLICATIONS

"Office Action of Taiwan Counterpart Application," dated Oct. 7, 2019, p. 1-p. 5.

* cited by examiner

*Primary Examiner* — Hiep T Nguyen (74) *Attorney, Agent, or Firm* — JCIPRNET (57) ABSTRACT

A command processing method and a storage controller are provided. The command processing method includes: receiving multiple read-modify-write (RMW) commands by a command processing pool of the storage controller, wherein each of the RMW commands includes a read command and a write command in pairs; locking a queue by the command processing pool and transmitting a pending first read command of the RMW commands in the command processing pool to the queue; when a second read command paired with a second write command of the RMW commands is pending, not locking the queue by the command processing pool and not transmitting the second write command to the queue; and when a third read command paired with a third write command of the RMW commands is not pending, locking the queue by the command processing pool and transmitting the third write command to the queue.

14 Claims, 7 Drawing Sheets

COMMAND PROCESSING METHOD AND STORAGE CONTROLLER USING THE SAME

CROSS-REFERENCE TO RELATED APPLICATION

This application claims the priority benefit of Taiwan application serial no. 107139069, filed on Nov. 2, 2018. The entirety of the above-mentioned patent application is hereby incorporated by reference herein and made a part of this specification.

BACKGROUND

Field of the Invention

The invention relates to a command processing method and a storage controller using the same. More particularly, the invention relates to a command processing method and a storage controller using the same that can prevent a deadlock.

Description of Related Art

In a technical field related to NAND flash-based storage devices, dies of a NAND flash memory usually form a two-dimensional array to meet a high-capacity demand and a high-speed access requirement. In order to process data access with complexity and low latency, currently available storage controllers almost use multiple central processing units (CPUs) and multiple command queues to control operations of, for example, reading, programming and erasing the dies of the NAND flash memory. In a currently existing storage controller design, a command queue is usually designed to schedule a read command, a program command and an erase command of a die. The multiple CPUs are configured to process the read command, the program command and the erase command simultaneously received from a host system.

A data size addressed by a logic-to-physical (L2P) table entry is usually greater than a size of a logic block address (LBA). In this case, an L2P table entry may also referred to as a logic block number (LBN). For example, a common size of the LBA is 512 bytes, and a data size addressed by the L2P table entry is 4096 bytes. In other words, 8 consecutive 512-byte LBAs constitute an LBN. In this circumstance, when a data size of data corresponding to a write command is not a multiple of 4096 bytes, or a starting LBA of the write command is not aligned to a multiple of 8, a flash translation layer (FTL) must perform a read-modify-write (RMW) procedure.

The RMW procedure includes the following steps: reading corresponding LBN data from a physical address to a random access memory (RAM); writing latest data corresponding to an LBA from a host to the RAM; and writing new LBN data to the physical address. In the three steps of the RMW procedure described above, two access operations are performed on the physical address, namely, the reading operation in the first step and the programming operation in the third step. Thus, when two CPUs of the storage controller simultaneously perform the RMW procedure, a deadlock may probably occur.

Figure 1:
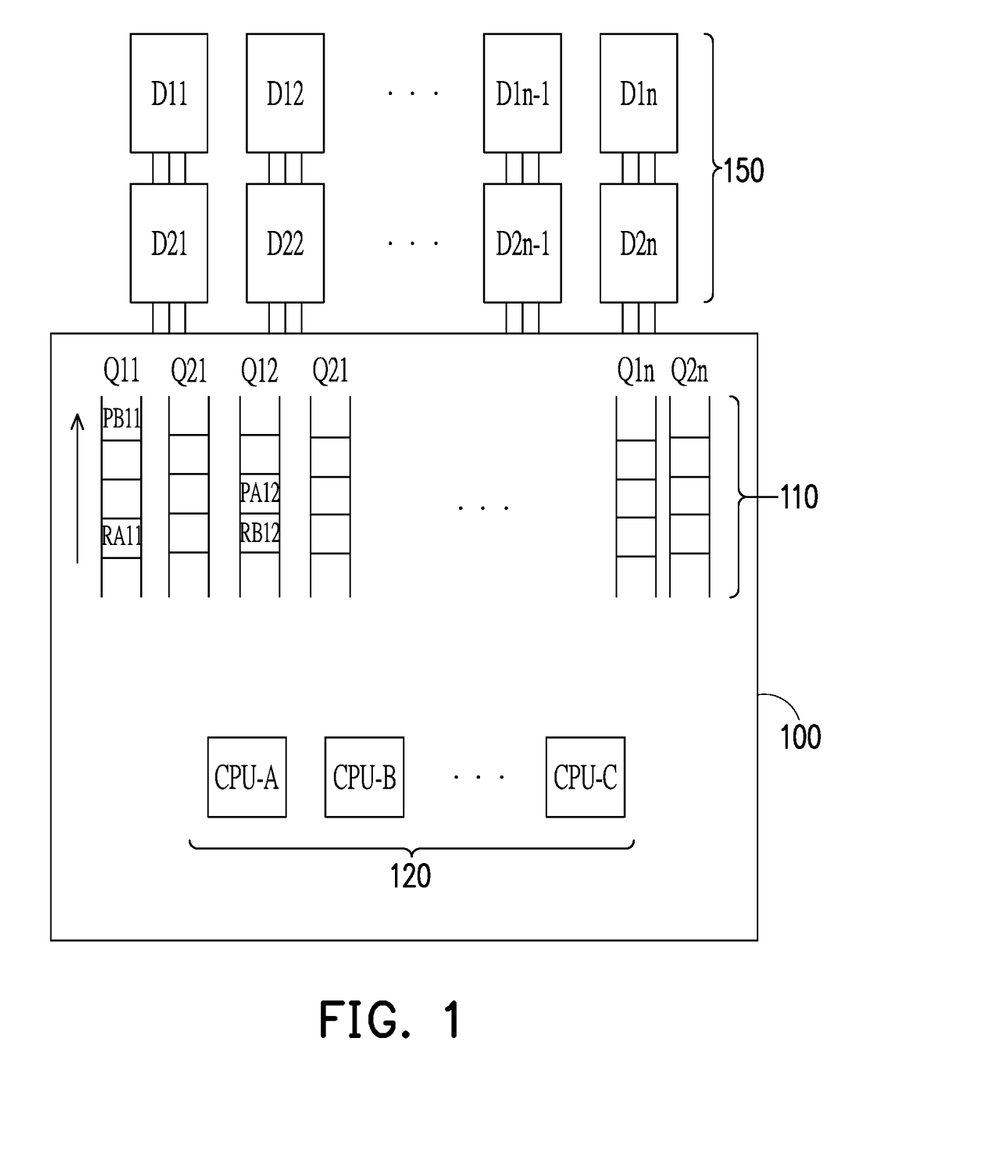
FIG. 1 is a schematic view showing that a deadlock occurs to a conventional storage controller.

Taking FIG. 1 for example, a storage controller 100 may be coupled to a flash memory array 150. The flash memory array 150 may respectively correspond to command queues 110, for example, D11 corresponds to Q11, D21 corresponds to Q21, D2n corresponds to Q2n and so on. The storage controller 100 has a plurality of processors 120. The processors 120 transmit commands to the command queues 110. Each of D11 to D2n may include one to a plurality of logic unit numbers (LUNs), and each LUN may be a die.

For example, CPU-A may perform a RMW procedure to read data from D11, modify the data and program the data to D12. CPU-B may perform the RMW procedure to read the data from D12, modify the data and program the data to D11. Thus, CPU-A may transmit a read command (i.e., RA11) to Q11 and transmit a program command (i.e., PA12) to Q12. RA11 represents that CPU-A transmits a read command to the command queue Q11. PA12 represents that CPU-A transmits a program command to the command queue Q12. In addition, CPU-B may transmit a read command (i.e., RB12) to Q12 and transmit a program command (i.e., PB11) to Q11. It should be noted that the program commands are valid only after the storage controller 100 modifies the data. Resources of the command queues Q11, Q12, ... and Q2n are used by the processors CPU-A, CPU-B, ... and CPU-C, and thus, CPU-A, CPU-B, ... and CPU-C compete for the resources of the command queues 110. When CPU-A obtains a using authority of Q12 in advance of CPU-B, and CPU-B obtains a using authority of Q11 in advance of CPU-A, PA12 enters Q12 in advance of RB12, and PB11 enters Q11 in advance of RA11. In this way, a deadlock occurs. Thus, how to design a storage controller to prevent the occurrence of the deadlock when performing multiple RMW procedures is a target that technicians of this field make effort to.

SUMMARY

The invention provides a command processing method and a storage controller using the method which can prevent the occurrence of the deadlock when multiple (read-modify-write) RMW procedures are performed.

According to an embodiment of the invention, a command processing method for preventing a deadlock from occurring to a storage controller of a flash memory is provided. The command processing method includes: receiving multiple read-modify-write (RMW) commands by a command processing pool of the storage controller, wherein each of the RMW commands includes a read command and a write command in pairs; locking a queue by the command processing pool, and transmitting a pending first read command of the RMW commands in the command processing pool to the queue, wherein the queue corresponds to a logic unit number (LUN) of the flash memory; when a second read command paired with a second write command of the RMW commands is pending, not locking the queue by the command processing pool, and not transmitting the second write command to the queue; and when a third read command paired with a third write command of the RMW commands is not pending, locking the queue by the command processing pool, and transmitting the third write command to the queue.

In an embodiment of the invention, when the command processing pool locks the queue, only the RMW commands of the command processing pool are allowed to be transmitted to the queue.

In an embodiment of the invention, when the read command or the write command is in the command processing pool and not yet transmitted to the queue, the read command or the write command is pending. When the read command or the write command is transmitted from the command processing pool to the queue, the read command or the write command is not pending.

In an embodiment of the invention, the command processing pool receives a fourth read command corresponding to a first queue and a fourth write command corresponding to a second queue and receives a fifth read command corresponding to the second queue and a fifth write command corresponding to the first queue, the fourth read command and the fourth write command are in pairs, and the fifth read command and the fifth write command are in pairs, the first queue corresponds to a first LUN accessed by the fourth read command and the fifth write command, and the second queue corresponds to a second LUN accessed by the fourth write command and the fifth read command.

In an embodiment of the invention, when the command processing pool simultaneously locks the first queue and the second queue, the fourth read command and the fifth read command are respectively transmitted to the first queue and the second queue, and the fourth write command and the fifth write command are then respectively transmitted to the second queue and the first queue.

In an embodiment of the invention, when the command processing pool sequentially locks the first queue, the second queue and the first queue, the fourth read command is transmitted to the first queue, the fifth read command and the fourth write command are then respectively transmitted to the second queue in a random sequence, and the fifth write command is then transmitted to the first queue.

In an embodiment of the invention, when the command processing pool sequentially locks the second queue, the first queue and the second queue, the fifth read command is transmitted to the second queue, the fourth read command and the fifth write command are then respectively transmitted to the first queue in a random sequence, and then, the fourth write command is transmitted to the second queue.

According to an embodiment of the invention, a storage controller includes a plurality of command queues, a plurality of processors, executing multiple read-modify-write (RMW) commands; and a command processing pool. The command processing pool receives the RMW commands, wherein each of the RMW commands includes a read command and a write command in pairs. The command processing pool locks a queue, and the processors transmit a pending first read command of the RMW commands in the command processing pool to the queue, wherein the queue corresponds to an LUN of the flash memory. When a second read command paired with a second write command of the RMW commands is pending, the command processing pool does not lock the queue and not transmit the second write command to the queue. When a third read command paired with a third write command of the RMW commands is not pending, the command processing pool locks the queue by, and the third write command is transmitted to the queue.

In an embodiment of the invention, when the command processing pool locks the queue, only the RMW commands of the command processing pool are allowed to be transmitted to the queue.

In an embodiment of the invention, when the read command or the write command is in the command processing pool and not yet transmitted to the queue, the read command or the write command is pending. When the read command or the write command is transmitted to the queue, the read command or the write command is not pending.

In an embodiment of the invention, the command processing pool receives a fourth read command corresponding to a first queue and a fourth write command corresponding to a second queue and receives a fifth read command corresponding to the second queue and a fifth write command corresponding to the first queue, wherein the fourth read command and the fourth write command are in pairs, and the fifth read command and the fifth write command are in pairs, wherein the first queue corresponds to a first LUN accessed by the fourth read command and the fifth write command, and the second queue corresponds to a second LUN accessed by the fourth write command and the fifth read command.

In an embodiment of the invention, when the command processing pool simultaneously locks the first queue and the second queue, the fourth read command and the fifth read command are respectively transmitted to the first queue and the second queue, and the fourth write command and the fifth write command are then respectively transmitted to the second queue and the first queue.

In an embodiment of the invention, when the command processing pool sequentially locks the first queue, the second queue and the first queue, the fourth read command is transmitted to the first queue, the fifth read command and the fourth write command are then respectively transmitted to the second queue in a random sequence, and the fifth write command is then transmitted to the first queue.

In an embodiment of the invention, when the command processing pool sequentially locks the second queue, the first queue and the second queue, the fifth read command is transmitted to the second queue, the fourth read command and the fifth write command are then respectively transmitted to the first queue in a random sequence, and the fourth write command is then transmitted to the second queue.

To sum up, the command processing method and the storage controller using the method provided by the invention can schedule the commands to the queues by the command processing pool which temporarily stores the RMW commands. The command processing pool can lock the queues, and the pending read command in the command processing pool is transmitted to one of the queues. When a read command paired with a write command of the RMW commands is pending, the command processing pool does not lock any queue, and the write command is not transmitted to the queue. When a read command paired with a write command of the RMW commands is not pending, the command processing pool locks one of the queues, and the write command is transmitted to the queue. According to the command processing method of the invention, the deadlock can be prevented from occurring to the storage controller when processing the RMW commands.

To make the above features and advantages of the invention more comprehensible, embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 2:
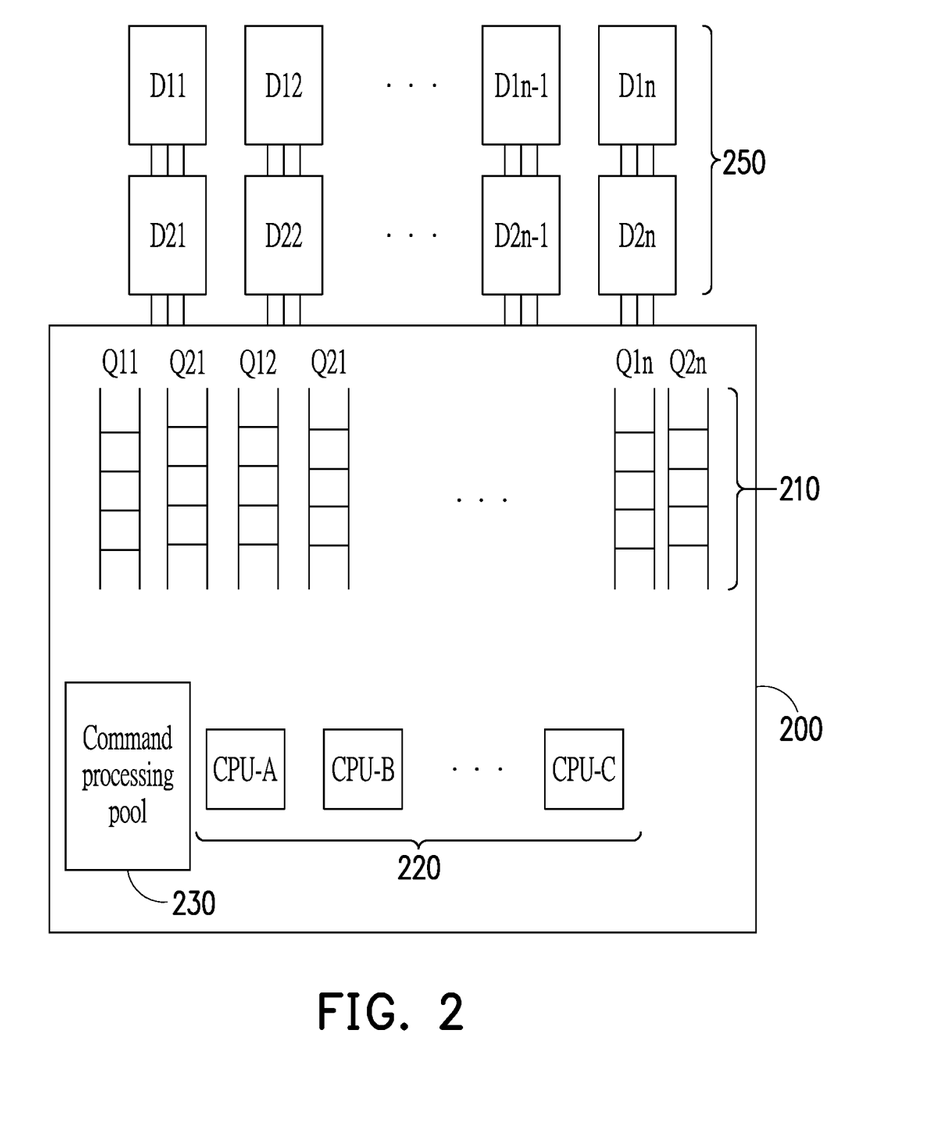
FIG. 2 is schematic drawing showing a storage controller according to an embodiment of the invention.

FIG. 2 is schematic drawing showing a storage controller according to an embodiment of the invention.

Referring to FIG. 2, a storage controller 200 of the invention includes command queues 210, processors 220 and a command processing pool 230. The storage controller 200 is coupled to a flash memory array 250. The command queues 210, the processors 220 and the flash memory array 250 are similar to the command queues 110, the processors 120 and the flash memory array 150 and thus, will not be repeatedly described. Each of D11 to D2n may be one to a plurality of logic unit numbers (LUNs), while an LUN may be a die.

In an embodiment, when the storage controller 200 receives a write command which requires to be transformed into a read-modify-write (RMW) command, the write command may be stored in the command processing pool 230. For example, when a size of data addressed by a flash translation layer (FTL) table of a storage device is 4 kilobytes (KB), but a logic block addresses (LBA) provided by the storage device to a host system for access is 512 bytes, and a size of data written by a write command is not a multiple of 4 KB, or a starting LBA written by the write command is not a multiple of 8, a part of the addresses written by the write command is transformed into RMW commands. When a read command of the RMW commands in the command processing pool 230 is not yet transmitted to a corresponding command queue 210, this read command is pending. Similarly, when a write command of the RMW commands in the command processing pool 230 is not yet transmitted to the corresponding command queue 210, this write command is pending. By contrast, when a read command of the RMW commands in the command processing pool 230 is transmitted to the corresponding command queue 210, this read command is not pending. When a write command of the RMW commands in the command processing pool 230 is transmitted to the corresponding command queue 210, this write command is not pending.

The command processing pool 230 may publish the read commands and the write commands according to three rules below (i.e., transmit the read commands and the write commands to the corresponding command queues 210).

[Rule 1]

The command processing pool 230 locks one of the command queues 210, and a pending first read command of the RMW commands in the command processing pool 230 is transmitted to the command queue 210.

[Rule 2]

When a second read command paired with a second write command of the RMW commands in the command processing pool 230 is pending, the command processing pool 230 does not lock any command queue 210, and the second write command is not transmitted to the command queue 210.

[Rule 3]

When a third read command paired with a third write command of the RMW commands in the command processing pool 230 is not pending, the command processing pool 230 locks one of the command queues 210, and the third write command is transmitted to the command queue 210.

It should be noted that in the present embodiment, the storage controller 200, as long as receiving an RMW command, transmits the RMW command to the command processing pool 230. In other words, the command processing pool 230 temporarily stores all the RMW commands.

Regarding commands other than the RMW commands, the processors 220 publish these commands to the command queues 210.

Thus, the read commands and the write commands of multiple RMW commands may be transmitted from the command processing pool 230 configured according to an embodiment of the invention to the command queues 210 according to the aforementioned three rules without encountering any deadlock.

Figure 3:
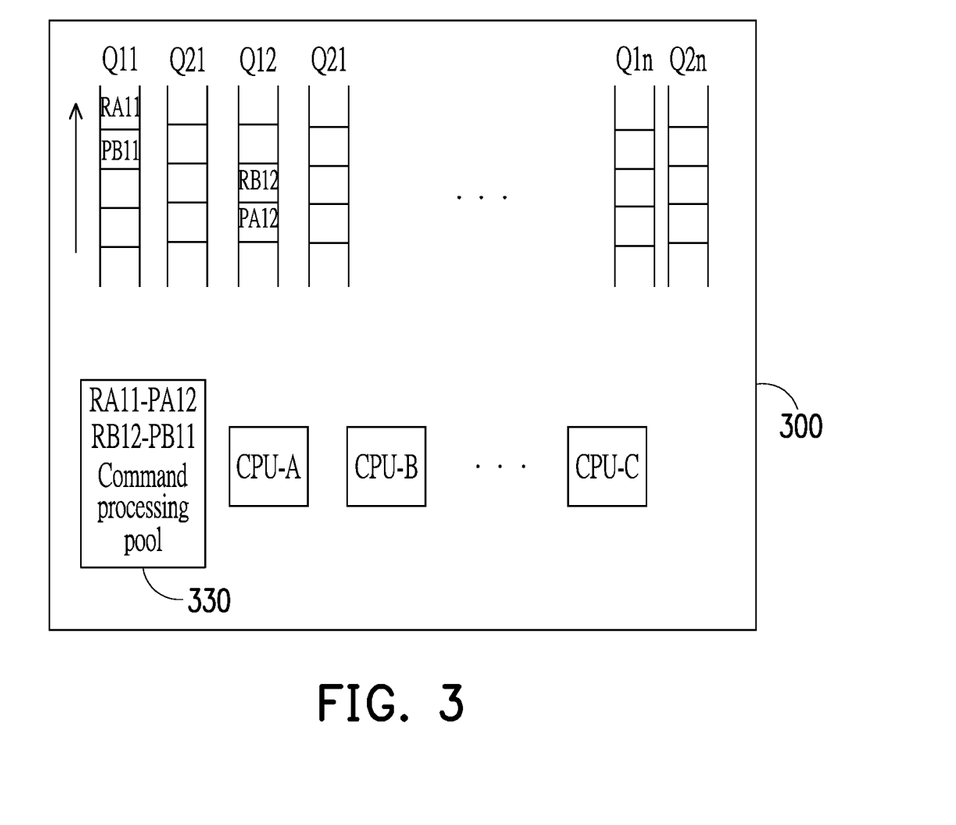
FIG. 3 illustrates an example of a command processing method according to an embodiment of the invention.

FIG. 3 illustrates an example of a command processing method according to an embodiment of the invention.

Referring to FIG. 3, CPU-A places RMW commands including RA11-PA12 to a command processing pool 330. CPU-B places RMW commands including RB12-PB11 to the command processing pool 330. The command processing pool 330 locks the command queues Q11 and Q12. The definitions with respect to RA11, PA12, RB12 and PB11 have been described above and thus, will not be repeatedly described.

In FIG. 3, the command processing pool 330 simultaneously locks both the command queues Q11 and Q12. First, RA11 and RB12 are respectively transmitted to Q11 and Q12 according to Rule 1. After RA11 and RB12 are respectively transmitted to Q11 and Q12, PA12 and PB11 are respectively transmitted to Q11 and Q12 according to Rule 3. Thus, the deadlock does not occur in this example.

Figure 4A:
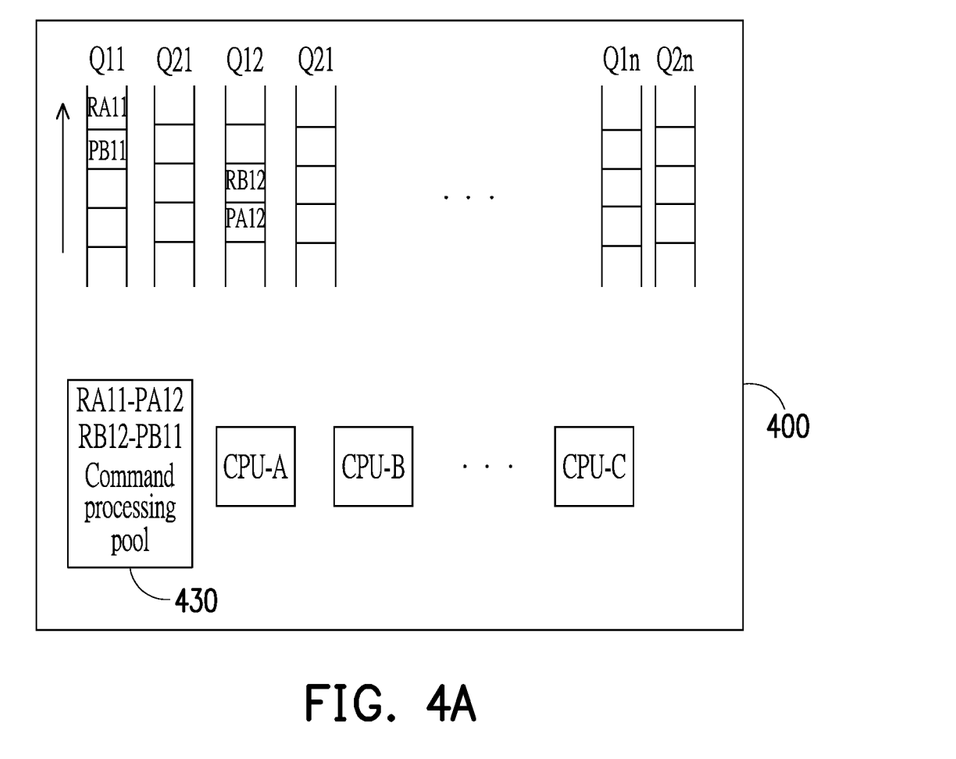
FIG. 4A and FIG. 4B illustrate an example of a command processing method according to another embodiment of the invention.
Figure 4B:
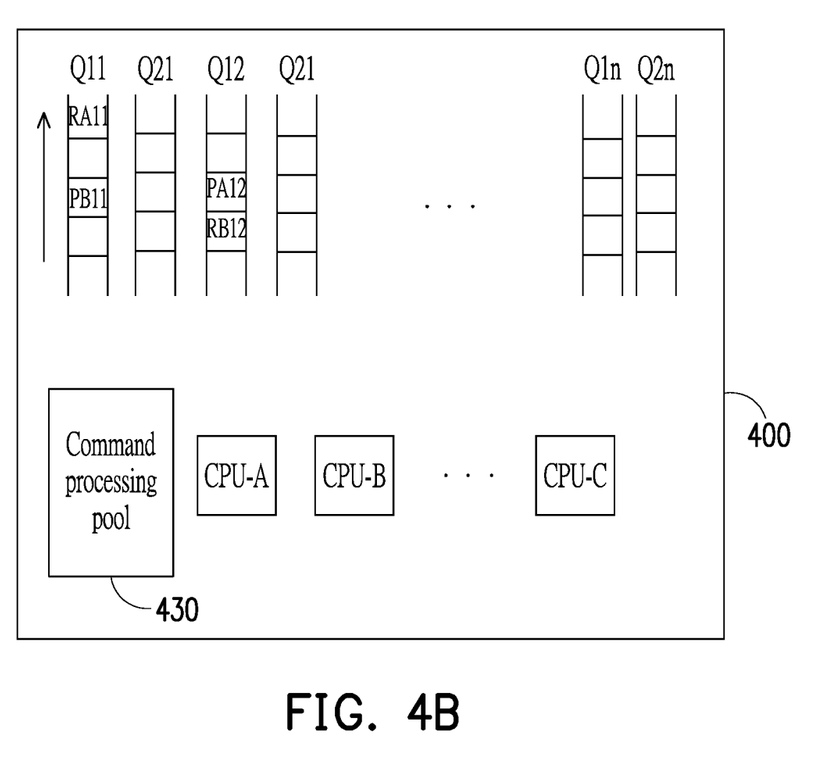

FIG. 4A and FIG. 4B illustrate an example of a command processing method according to another embodiment of the invention.

Referring to FIG. 4A and FIG. 4B, CPU-A places the RMW commands including RA11-PA12 to a command processing pool 430. CPU-B places RMW commands including RB12-PB11 to the command processing pool 430. The command processing pool 430 locks the command queues Q11 and Q12.

In FIG. 4A and FIG. 4B, the command processing pool 430 sequentially locks Q11, Q12 and Q11. First, when Q11 is locked, RA11 is first transmitted to Q11 according to Rule 1. When Q12 is locked, RB12 and PA12 are transmitted to Q12 according to Rule 1 and Rule 3 in an arbitrary sequence (or a random sequence). FIG. 4A illustrates that RB12 is transmitted to Q12 in advance of PA12. FIG. 4B illustrates that PA12 is transmitted to Q12 in advance of RB12. Lastly, when Q11 is again locked, PB11 is transmitted to Q11 according to Rule 3. Thus, the deadlock does not occur neither in the scenario illustrated in FIG. 4A nor in the scenario illustrated in FIG. 4B.

Figure 5A:
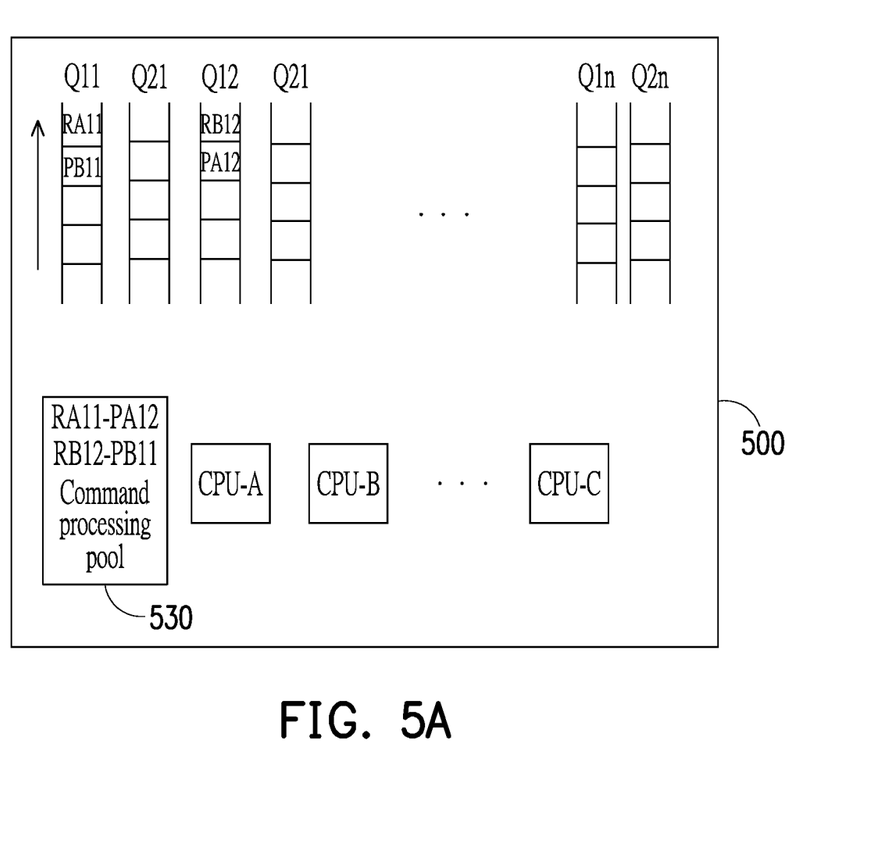
FIG. 5A and FIG. 5B illustrate an example of a command processing method according to another embodiment of the invention.
Figure 5B:
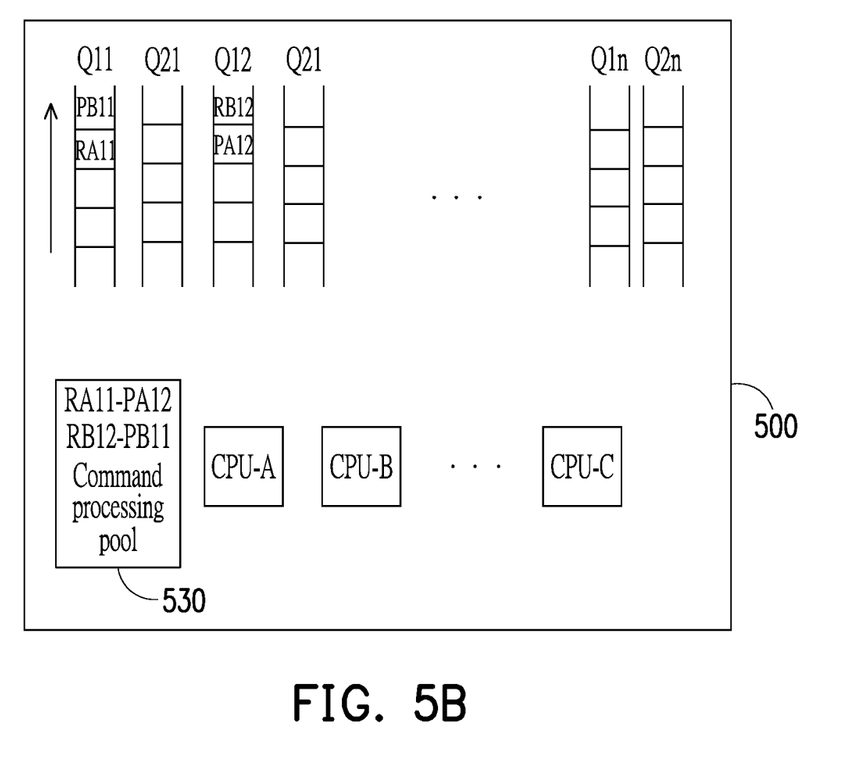

FIG. 5A and FIG. 5B illustrate an example of a command processing method according to another embodiment of the invention.

Referring to FIG. 5A and FIG. 5B, CPU-A places the RMW commands including RA11-PA12 to a command processing pool 530. CPU-B places the RMW commands including RB12-PB11 to the command processing pool 530. The command processing pool 530 locks the command queues Q11 and Q12.

In FIG. 5A and FIG. 5B, the command processing pool 530 sequentially locks Q12, Q11 and Q12. First, when Q12 is locked, RB12 is transmitted to Q12 according to Rule 1. When Q11 is locked, RA11 and PB11 are transmitted to Q11 according to Rule 1 and Rule 3 in an arbitrary sequence (or a random sequence). FIG. 5A illustrates that RA11 is transmitted to Q11 in advance of PB11. FIG. 5B illustrates that PB11 is transmitted to Q11 in advance of RA11. Lastly, when Q12 is again locked, PA12 is transmitted to Q12 according to Rule 3. Thus, the deadlock does not occur neither in the scenario illustrated in FIG. 5A nor in the scenario illustrated in FIG. 5B.

Based on the above, the command processing method and the storage controller using the method provided by the invention can schedule the commands to the queues by the command processing pool which temporarily stores the RMW commands. The command processing pool can lock the queues, and the pending read command in the command processing pool is transmitted to one of the queues. When a read command paired with a write command of the RMW commands is pending, the command processing pool does not lock any queue, and the write command is not transmitted to the queue. When a read command paired with a write command of the RMW commands is not pending, the command processing pool locks one of the queues, and the write command is transmitted to the queue. According to the command processing method of the invention, the deadlock can be prevented from occurring to the storage controller when processing the RMW commands.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A command processing method for preventing a deadlock from occurring to a storage controller of a flash memory, comprising:
   receiving multiple read-modify-write (RMW) commands by a command processing pool of the storage controller, wherein each of the RMW commands comprises a read command and a write command in pairs;
   locking a queue by the command processing pool, and transmitting a pending first read command of the RMW commands in the command processing pool to the queue, wherein the queue corresponds to a logic unit number (LUN) of the flash memory;
   when a second read command paired with a second write command of the RMW commands is pending, not locking the queue by the command processing pool, and not transmitting the second write command to the queue; and
   when a third read command paired with a third write command of the RMW commands is not pending, locking the queue by the command processing pool, and transmitting the third write command to the queue.

2. The command processing method according to claim 1, wherein when the command processing pool locks the queue, only the RMW commands of the command processing pool are allowed to be transmitted to the queue.

3. The command processing method according to claim 1, wherein when the read command or the write command is in the command processing pool and not yet transmitted to the queue, the read command or the write command is pending, and when the read command or the write command is transmitted to the queue, the read command or the write command is not pending.

4. The command processing method according to claim 1, wherein the command processing pool receives a fourth read command corresponding to a first queue and a fourth write command corresponding to a second queue and receives a fifth read command corresponding to the second queue and a fifth write command corresponding to the first queue, wherein the fourth read command and the fourth write command are in pairs, and the fifth read command and the fifth write command are in pairs, wherein the first queue corresponds to a first LUN accessed by the fourth read command and the fifth write command, and the second queue corresponds to a second LUN accessed by the fourth write command and the fifth read command.

5. The command processing method according to claim 4, wherein when the command processing pool simultaneously locks the first queue and the second queue, the fourth read command and the fifth read command are respectively transmitted to the first queue and the second queue, and the fourth write command and the fifth write command are then respectively transmitted to the second queue and the first queue.

6. The command processing method according to claim 4, wherein when the command processing pool sequentially locks the first queue, the second queue and the first queue, the fourth read command is transmitted to the first queue, the fifth read command and the fourth write command are then respectively transmitted to the second queue in a random sequence, and the fifth write command is then transmitted to the first queue.

7. The command processing method according to claim 4, wherein when the command processing pool sequentially locks the second queue, the first queue and the second queue, the fifth read command is transmitted to the second queue, the fourth read command and the fifth write command are transmitted to the first queue in a random sequence, and the fourth write command is then transmitted to the second queue.

8. A storage controller, comprising:
   a plurality of command queues;
   a plurality of processors, executing multiple RMW commands; and
   a command processing method, wherein
   the command processing pool receives the RMW commands, wherein each of the RMW commands comprises a read command and a write command in pairs;
   the command processing pool locks a queue, and the processors transmit a pending first read command of the RMW commands in the command processing pool to the queue, wherein the queue corresponds to a logic unit number (LUN) of the flash memory;
   when a second read command paired with a second write command of the RMW commands is pending, the command processing pool does not lock the queue, and the second write command is not transmitted to the queue; and
   when a third read command paired with a third write command of the RMW commands is not pending, the command processing pool locks the queue, and the third write command is transmitted to the queue.

9. The storage controller according to claim 8, wherein when the command processing pool locks the queue, only the RMW commands of the command processing pool are allowed to be transmitted to the queue.

10. The storage controller according to claim 8, wherein when the read command or the write command is in the command processing pool and not yet transmitted to the queue, the read command or the write command is pending, and when the read command or the write command is transmitted to the queue, the read command or the write command is not pending.

11. The storage controller according to claim 8, wherein when the command processing pool receives a fourth read command corresponding to a first queue and a fourth write command corresponding to a second queue and receives a fifth read command corresponding to the second queue and a fifth write command corresponding to the first queue, wherein the fourth read command and the fourth write command are in pairs, and the fifth read command and the fifth write command are in pairs, wherein the first queue corresponds to a first LUN accessed by the fourth read command and the fifth write command, and the second queue corresponds to a second LUN accessed by the fourth write command and the fifth read command.

12. The storage controller according to claim 11, wherein when the command processing pool simultaneously locks the first queue and the second queue, the fourth read command and the fifth read command are respectively transmitted to the first queue and the second queue, and the fourth write command and the fifth write command are then respectively transmitted to the second queue and the first queue.

13. The storage controller according to claim 11, wherein when the command processing pool sequentially locks the first queue, the second queue and the first queue, the fourth read command is transmitted to the first queue, the fifth read command and the fourth write command are then respectively transmitted to the second queue in a random sequence, and then, the fifth write command is transmitted to the first queue.

14. The storage controller according to claim 11, wherein when the command processing pool sequentially locks the second queue, the first queue and the second queue, the fifth read command is transmitted to the second queue, the fourth read command and the fifth write command are then transmitted to the first queue in a random sequence, and the fourth write command is then transmitted to the second queue.

* * * * *